(12) United States Patent  (10) Patent No.: US 8,314,795 B2
Tsuboyama  (45) Date of Patent: Nov. 20, 2012

(54) IMAGE PROCESSING DEVICE, IMAGE PROCESSING METHOD AND INFORMATION STORAGE MEDIUM

(75) Inventor: Masashi Tsuboyama, Kanagawa (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 822 days.

(21) Appl. No.: 12/375,219

(22) PCT Filed: Jun. 7, 2007

(86) PCT No.: PCT/JP2007/061535
§ 371 (c)(1),
(2), (4) Date: Jan. 27, 2009

(87) PCT Pub. No.: WO2008/012995
PCT Pub. Date: Jan. 31, 2008

(65) Prior Publication Data
US 2009/0251463 A1 Oct. 8, 2009

(30) Foreign Application Priority Data
Jul. 28, 2006 (JP) ................................ 2006-205765

(51) Int. Cl.
*G06T 15/40* (2006.01)
(52) U.S. Cl. ....................................... 345/422; 345/426
(58) Field of Classification Search .................... 345/426
See application file for complete search history.

(56) References Cited

U.S. PATENT DOCUMENTS

| | | | |
|---|---|---|---|
| 6,259,455 B1 * | 7/2001 | Shaw et al. | .................. 345/426 |
| 2002/0070935 A1 | 6/2002 | Suzuki | |
| 2004/0095753 A1 | 5/2004 | Hsien | |
| 2004/0109000 A1 * | 6/2004 | Chosokabe | .................. 345/426 |

(Continued)

FOREIGN PATENT DOCUMENTS
CN 1708775 A 12/2005
(Continued)

OTHER PUBLICATIONS

Chinese Office Action corresponding to Chinese Patent Application No. 200780028149.9, dated Dec. 24, 2010.

(Continued)

*Primary Examiner* — Daniel Washburn
*Assistant Examiner* — Kyle Zhai
(74) *Attorney, Agent, or Firm* — Sughrue Mion, PLLC

(57) ABSTRACT

To provide an image processing device capable of simplifying a process for highlight expression. The present invention relates to an image processing device for displaying a picture obtained by viewing a virtual three dimensional space from a given viewpoint. According to the present invention, a first object (an inner surface object (50)) having a texture image (54) attached thereon is placed in the virtual three dimensional space (40), the texture image (54) including a highlight image portion (54a) for expressing highlights caused by light reflection. Also, a second object (an outer surface object (48)) having an opening (49), a notch, or a semi-transparent portion formed on a part thereof is placed in the virtual three dimensional space (40) such that the position, in the virtual three dimensional space, of the highlight image portion (54a) of the texture image (54) attached on the first object and the position, in the virtual three dimensional space (40), of the opening (49), the notch, or the semi-transparent portion of the second object, have a predetermined positional relation with each other.

16 Claims, 12 Drawing Sheets

U.S. PATENT DOCUMENTS

2005/0250579 A1* 11/2005 Birdwell .................. 463/33
2006/0123681 A1   6/2006 Gotzy

FOREIGN PATENT DOCUMENTS

| | | |
|---|---|---|
| JP | 2001-084391 A | 3/2001 |
| JP | 2002-183754 A | 6/2002 |
| JP | 2003-245466 A | 9/2003 |
| JP | 2004-192069 A | 7/2004 |

OTHER PUBLICATIONS

Blender 3D: Noob to Pro/Creating Pixar-Looking Eyes in Blender http://en.wikibooks.org, pp. 1 and 3. XP002573387.
Supplementary European Search Report corresponding to European Patent Application No. 07744865.2, dated Mar. 30, 2010.

* cited by examiner

FIG. 11
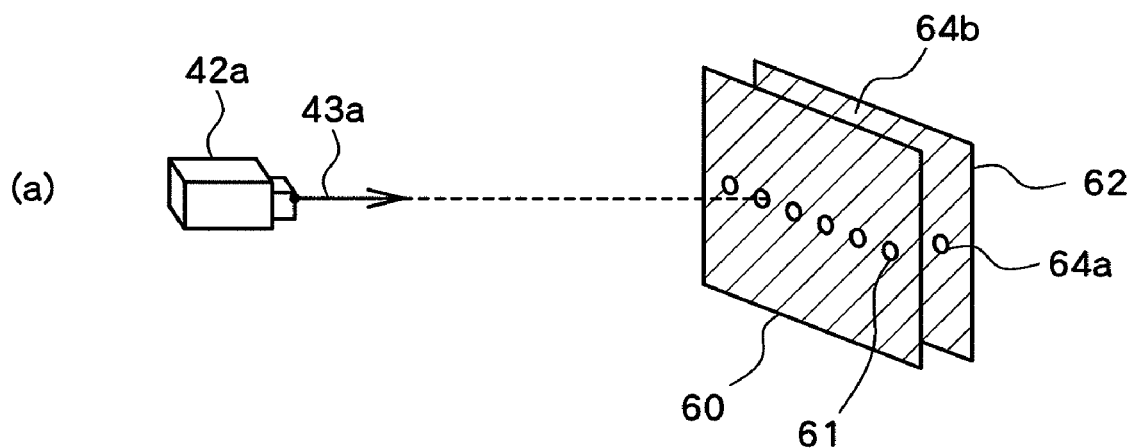
(a)
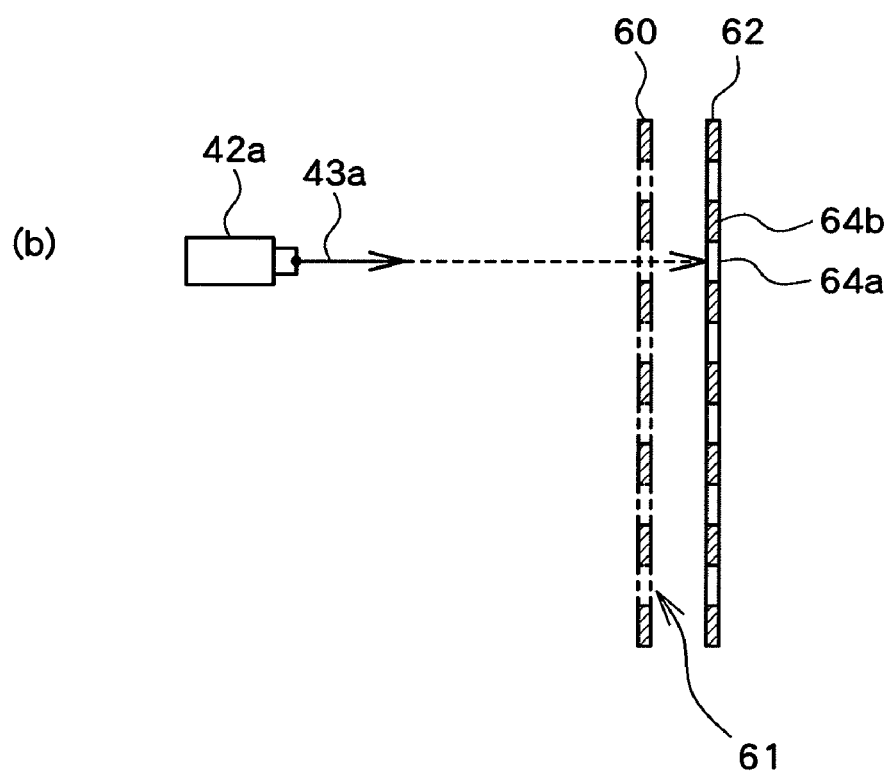
(b)

FIG.12
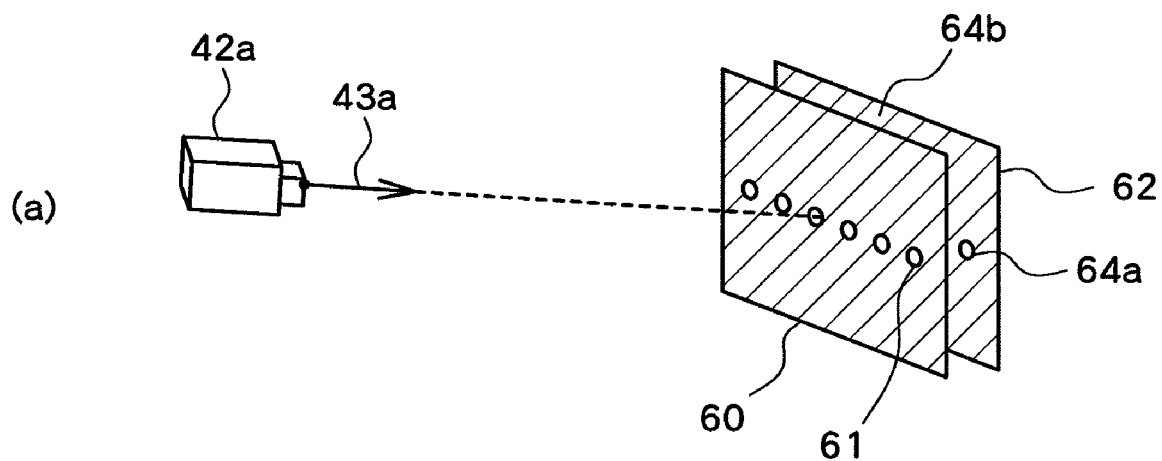
(a)
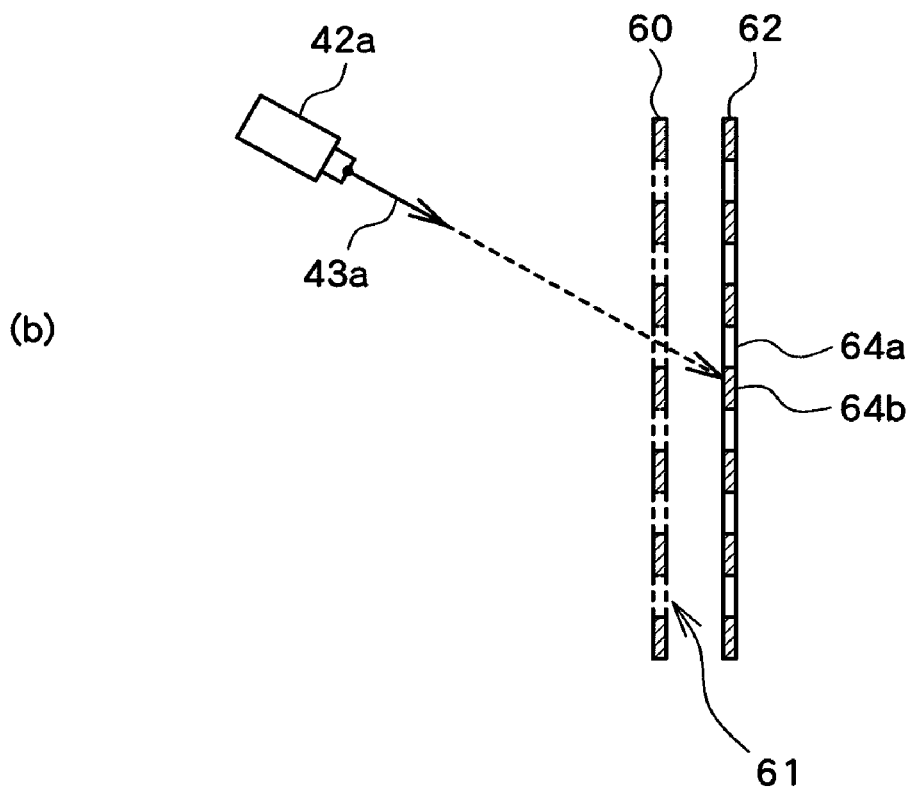
(b)

IMAGE PROCESSING DEVICE, IMAGE PROCESSING METHOD AND INFORMATION STORAGE MEDIUM

TECHNICAL FIELD

The present invention relates to an image processing device, an image processing method, and an information storage medium.

BACKGROUND ART

There is known an image processing device for showing a picture obtained by viewing a virtual three dimensional space from a given viewpoint. There is also known a technique, when employed in such an image processing device, for expressing highlights caused on a surface of an object due to light reflection.

Japanese Patent Laid-open Publication No. 2004-192069

DISCLOSURE OF THE INVENTION

Problem to be Solved by the Invention

However, an attempt to realize the above described highlight expression in, e.g., real time three dimensional image processing may result in a heavy processing load. In view of the above, simplification of a process for highlight expression is strongly desired.

The present invention has been conceived in view of the above, and an object thereof is to provide an image processing device, an image processing method, and an information storage medium capable of simplifying a process for highlight expression.

Means for Solving the Problem

In order to achieve the above described object, according to one aspect of the present invention, there is provided an image processing device for displaying a picture obtained by viewing a virtual three dimensional space from a given viewpoint, comprising means for placing a first object in the virtual three dimensional space, the first object having a texture image including a highlight image for presenting highlights caused by light reflection; and means for placing a second object having an opening, a notch, or a semi-transparent portion formed on a part thereof in the virtual three dimensional space such that a position in the virtual three dimensional space, of the highlight image portion of the texture image attached on the first object and a position in the virtual three dimensional space, of the opening, the notch, or the semi-transparent portion of the second object, have a predetermined positional relation with each other.

Also, according to another aspect of the present invention, there is provided an image processing method for displaying a picture obtained by viewing a virtual three dimensional space from a given viewpoint, comprising a step of placing a first object in the virtual three dimensional space, the first object having a texture image including a highlight image for presenting highlights caused by light reflection; and a step of placing a second object having an opening, a notch, or a semi-transparent portion formed on a part thereof in the virtual three dimensional space such that a position in the virtual three dimensional space, of the highlight image portion of the texture image attached on the first object and a position in the virtual three dimensional space, of the opening, the notch, or the semi-transparent portion of the second object, have a predetermined positional relation with each other.

Also, according to still another aspect of the present invention, there is provided a program for causing a computer, such as a consumer game device, a portable game device, a commercial game device, a portable phone, a personal digital assistant (PDA), a personal computer, and the like, to function as an image processing device for displaying a picture obtained by viewing a virtual three dimensional space from a given viewpoint, the computer functioning as means for placing a first object in the virtual three dimensional space, the first object having a texture image including a highlight image for presenting highlights caused by light reflection; and means for placing a second object having an opening, a notch, or a semi-transparent portion formed on a part thereof in the virtual three dimensional space such that a position in the virtual three dimensional space, of the highlight image portion of the texture image attached on the first object and a position in the virtual three dimensional space, of the opening, the notch, or the semi-transparent portion of the second object, have a predetermined positional relation with each other.

Also, an information storage medium according to the present invention is a computer readable information storage medium storing the above-described program. A program distribution device according to the present invention is a program distribution device comprising an information storage medium storing the above described program, for reading the above described program from the information storage medium and distributing. A program distribution method according to the present invention is a program distribution method for reading the above-described program from the information storage medium storing the above-described program and distributing.

The present invention relates to an image processing device for displaying a picture obtained by viewing a virtual three dimensional space from a given viewpoint. According to the present invention, a first object having a texture image attached thereon is placed in the virtual three dimensional space, the texture image including a highlight image for presenting highlights caused by light reflection. A second object having an opening, a notch, or a semi-transparent portion formed on a part thereof is placed in the virtual three dimensional space such that the position in the virtual three dimensional space, of the highlight image portion of the texture image attached on the first object and the position in the virtual three dimensional space, of the opening, notch, or semi-transparent portion of the second object, have a predetermined positional relation with each other. According to the present invention, it is possible to simplify a process for highlight expression.

According to one embodiment of the present invention, the second object may be placed such that the opening, the notch, or the semi-transparent portion of the second object is located on a straight line connecting a position of the viewpoint and the position in the virtual three dimensional space, of the highlight image portion of the texture image attached on the first object only in the case where the position of the viewpoint and the position in the virtual three dimensional space, of the highlight image portion of the texture image attached on the first object, have a predetermined positional relation with each other.

According to another embodiment of the present invention, the second object may be a hollow object, and the first object may be placed inside the second object.

According to still another embodiment of the present invention, a texture image may be attached on the second object, and an image for a portion other than the highlight image portion of the texture image attached on the first object may be an image based on the texture image attached on the second object.

BRIEF DESCRIPTION OF THE DRAWINGS

FIG. 11 is a diagram showing one example of a positional relation among the virtual camera, a wall object, and the highlight expressing object;

FIG. 12 is a diagram showing another example of a positional relation among the virtual camera, wall object, and highlight expressing object;

BEST MODE FOR CARRYING OUT THE INVENTION

In the following, one example of an embodiment of the present invention will be described in detail with reference to the accompanying drawings.

1. First Embodiment

Figure 1:
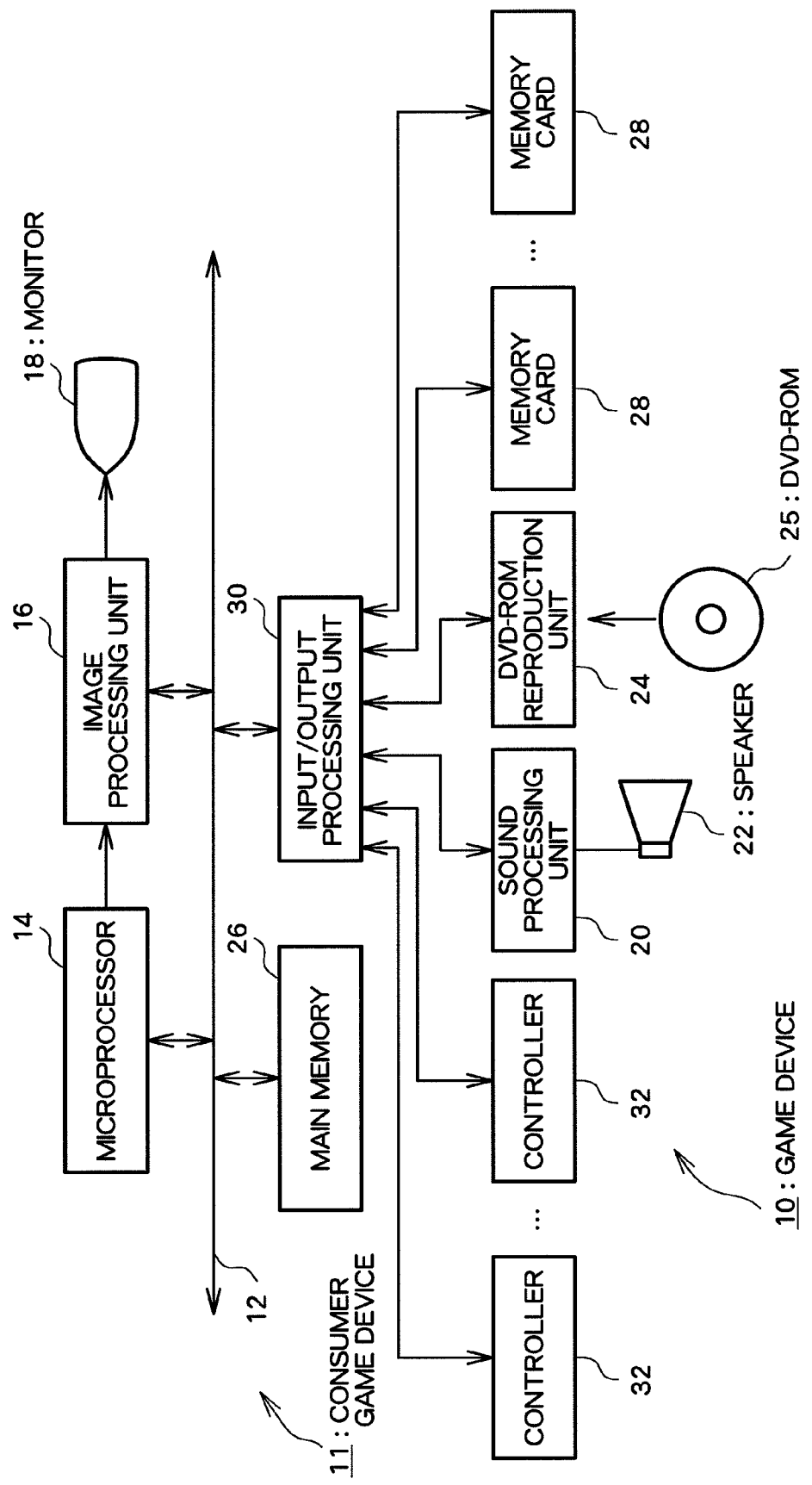
FIG. 1 is a diagram showing a hardware structure of a game device according to first and second embodiments.

FIG. 1 is a diagram showing a structure of a game device (an image processing device) according to a first embodiment of the present invention. The shown game device 10 comprises a consumer game device 11 having a DVD-ROM 25 and a memory card 28, or information storage media, mounted thereto and a monitor 18 and a speaker 22 connected thereto. For example, the monitor 18 may be a home-use television receiver, and the speaker 22 may be a built-in speaker of the home-use television receiver.

The consumer game device 11 is a publicly known computer game system comprising a bus 12, a microprocessor 14, an image processing unit 16, a sound processing unit 20, a DVD-ROM reproduction unit 24, a main memory 26, an input/output processing unit 30, and a controller 32. The respective structural elements other than the controller 32 are accommodated in an enclosure.

The bus 12 is used for exchanging an address and/or data among the respective units of the consumer game device 11. The microprocessor 14, image processing unit 16, main memory 26, and input/output processing unit 30 are mutually connected via the bus 12 for data exchange.

The microprocessor 14 controls the respective units of the consumer game device 11, based on an operation system stored in a ROM (not shown), a program read from the DVD-ROM 25, and data read from the memory card 28. The main memory 26 comprises a RAM, for example, into which a program read from the DVD-ROM 25 and/or data read from the memory card 28 is written as required. The main memory 26 is also used as a working memory of the microprocessor 14.

The image processing unit 16 comprises a VRAM, and renders a game screen image (a display image) to be displayed on the monitor 18 into the VRAM, based on the image data sent from the microprocessor 14. That is, the image processing unit 16 receives from the microprocessor 14, the vertex coordinates (X, Y, Z) of each polygon, described in the viewpoint coordinate system, vertex color information (R, G, B), texture coordinates (vx, vy) indicating a position in a texture image, corresponding to each vertex, an alpha value and the like. Then, the image processing unit 16 writes the color information, Z value (depth information), alpha value, and the like, of each of the pixels constituting a display image into a game screen image rendering area in the VRAM, using the information. In the above, where a texture image is written beforehand in the VRAM, an area in a texture image, specified by the respective texture coordinates is mapped (attached) to a polygon specified by the vertex coordinates corresponding to the texture coordinates. A display image produced as described above is converted into a video signal at a predetermined time, and output to the monitor 18.

The input/output processing unit 30 is an interface, via which the microprocessor 14 accesses the sound processing unit 20, DVD-ROM reproduction unit 24, memory card 28, and controller 32. The sound processing unit 20, DVD-ROM reproduction unit 24, memory card 28, and controller 32 are connected to the input/output processing unit 30.

The sound processing unit 20 comprises a sound buffer, and reproduces various sound data, such as game music, game sound effects, a message, and the like, read from the DVD-ROM 25 and stored in the sound buffer, and outputs via the speaker 22.

The DVD-ROM reproduction unit 24 reads a program recorded in the DVD-ROM 25 according to an instruction from the microprocessor 14. It should be noted that although the DVD-ROM 25 is used here to provide a program to the consumer game device 11, any other information storage medium, such as a CD-ROM, a ROM card, and the like, may be used instead. Alternatively, a program may be provided via a data communication network, such as the Internet or the like, from a remote place to the consumer game device 11.

The memory card 28 comprises a nonvolatile memory (e.g., EEPROM, and the like). The consumer game device 11 has a plurality of memory card slots defined therein each for accepting a memory card 28 so that a plurality of memory cards 28 can be mounted at the same time. The memory card 28 can be removed from the memory card slot and is used to store various game data, such as saved data and the like.

The controller 32 is a general purpose operation input means for use by the player to input various game operations. The input/output processing unit 30 scans the states of the respective units of the controller 32 every constant cycle (e.g., every $1/60^{th}$ of a second) and sends an operation signal describing the scanning result to the microprocessor 14 via the bus

12. The microprocessor 14 determines the game operation carried out by the player, based on the operation signal. The consumer game device 11 is adapted to connection to a plurality of controllers 32 so that the microprocessor 14 controls a game, based on operation signals input from the respective controllers 32.

In the game device 10 according to the first embodiment, a game program read from the DVD-ROM 25 is executed, whereby a game in which a player character object (an object representative of a main game character) moves in the darkness (a virtual three dimensional space) while holding an electric torch and fights off an enemy character object is realized. In the following, a technique for simplifying a process to present a picture in which the eyes of an enemy character object sparkle when the eyes of the player character meet those of the enemy character object is described.

Figure 2:
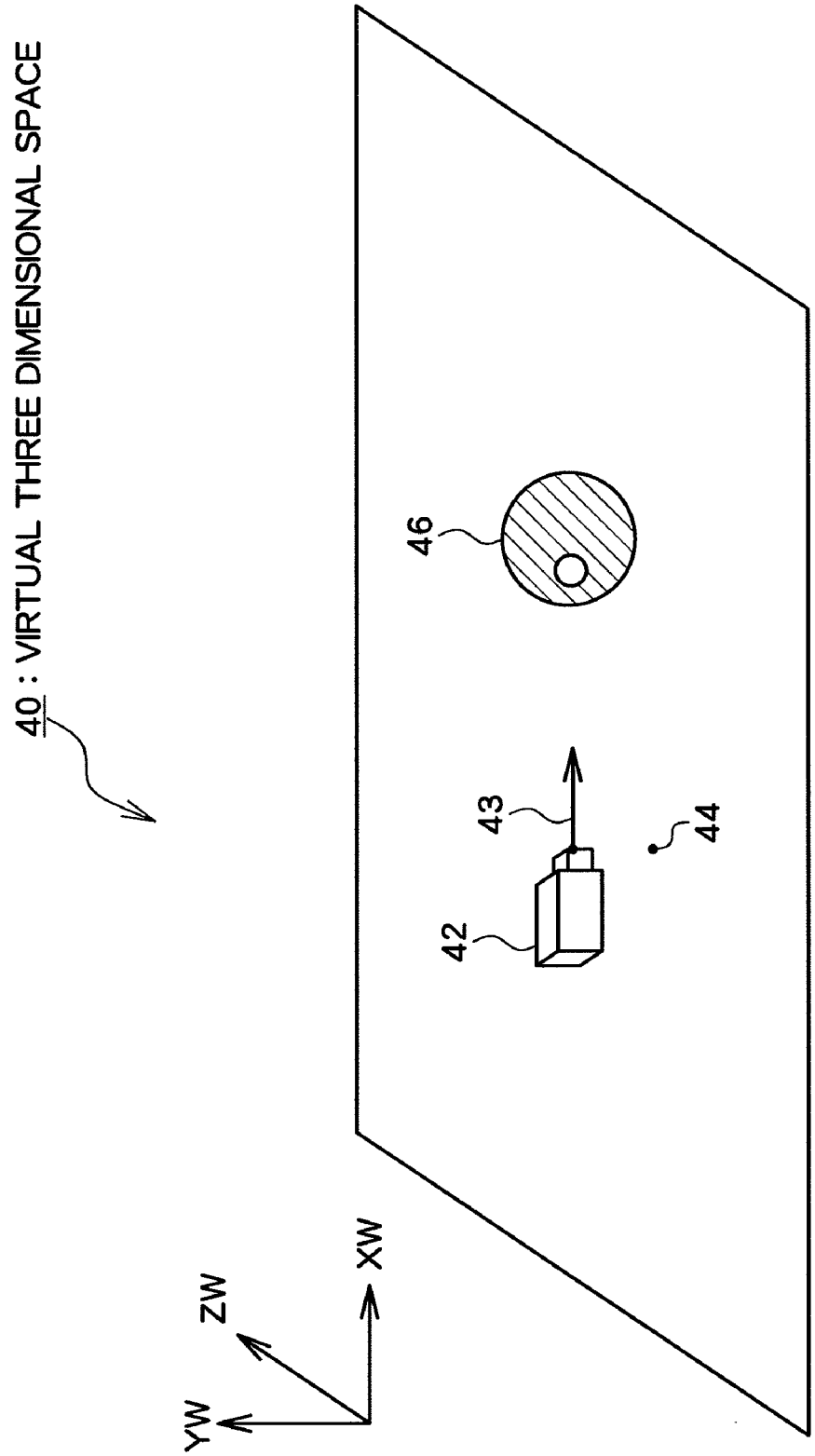
FIG. 2 is a diagram showing one example of a virtual three dimensional space.

FIG. 2 shows one example of a virtual three dimensional space created in the main memory 26. As shown in FIG. 2, a virtual camera 42 is placed in the virtual three dimensional space 40. A game screen image showing a picture obtained by viewing the virtual three dimensional space 40 from the virtual camera 42 is displayed on the monitor 18. The virtual camera 42 is placed in a position corresponding to the position of the eyes of the player character object, and the viewing direction 43 of the virtual camera 42 is set in the direction corresponding to the forward direction of the player character object. The position and posture (the viewing direction 43) of the virtual camera 42 change according to an operation carried out to the controller 32. As described above, in the game device 10, a picture obtained by viewing the virtual three dimensional space 40 from the player character object is shown on the game screen. That is, the above described game is realized as a so-called FPS (First Person Shooter) game.

Also, a light source 44 corresponding to the electric torch is set in the virtual three dimensional space 40. The light source 44 moves according to the movement of the virtual camera 42.

Also, an eye light expressing object 46 is placed in the virtual three dimensional space 40. The eye light expressing object 46 is an object for expressing a picture in which the eyes of an enemy character object sparkle. The eye light expressing object 46 is a spherical object and placed as a part of the enemy character object (e.g., an eyeball object representative of an eyeball of the enemy character) in the virtual three dimensional space 40. The enemy character object (the eye light expressing object 46) moves in the virtual three dimensional space 40 according to a predetermined algorithm.

Figure 3:
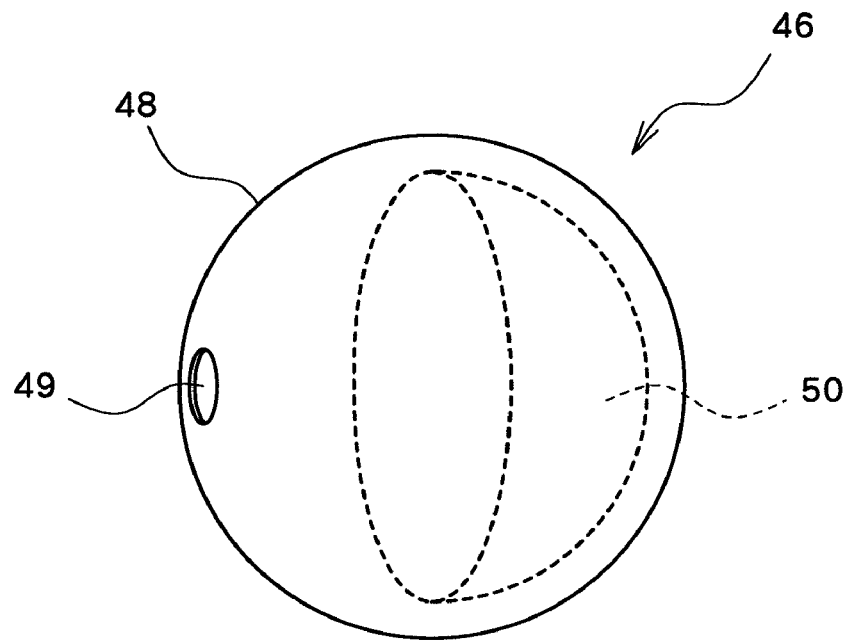
FIG. 3 is a cross sectional view of an eye light expressing object.

FIG. 3 shows an eye light expressing object 46. As shown in FIG. 3, the eye light expressing object 46 comprises an outer surface object 48 (a second object) and an inner surface object 50 (a first object) placed inside the outer surface object 48. The outer surface object 48 is an object corresponding to the outer surface of the sphere, being spherical and hollow. On the outer surface object 48, a hole (an opening) 49 is formed, penetrating to the other side (rear side) of the outer surface object 48. The inside of the outer surface object 48 can be seen through the hole 49 from the outside of the outer surface object 48. The inner surface object 50 is an object corresponding to the inner surface of the sphere, being semi-spherical and hollow.

Figure 4:
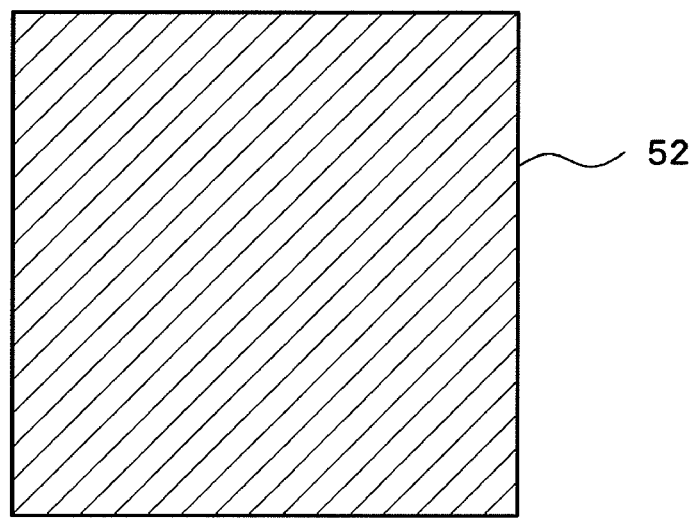
FIG. 4 is a diagram showing one example of a texture image to be attached on an outer surface object.
Figure 5:
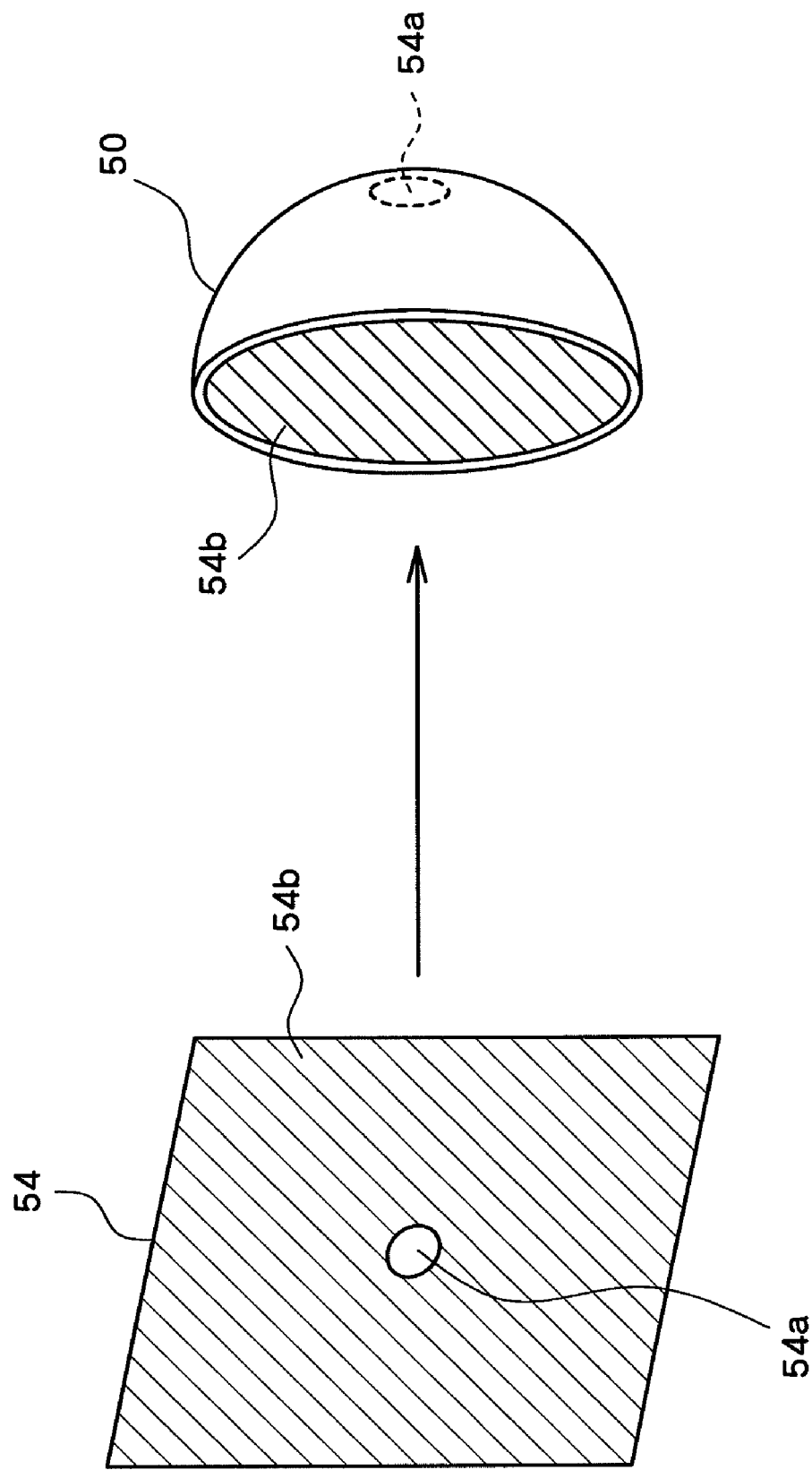
FIG. 5 is a diagram explaining one example of a texture image to be attached on an inner surface object.

FIG. 4 shows a texture image to be attached to the outer surface object 48. The texture image 52 is to be attached on the whole of the outer surface object 48, except for the hole 49. FIG. 5 is a diagram explaining a texture image to be attached on the inner surface object 50. As shown in FIG. 5, the texture image 54 to be attached on the inner surface object 50 has a highlight image portion 54a for expressing highlight caused by light reflection and a portion 54b (the part with diagonal lines in FIG. 5) other than the highlight image portion 54a. The portion 54b other than the highlight image portion 54a has a color and/or an image pattern identical to that of the texture image 52 attached on the outer surface object 48. The texture image 54 is attached on the inner surface object 50, as shown in FIG. 5.

The outer surface object 48 and inner surface object 50 are arranged such that the hole 49 of the outer surface object 48 and the highlight image portion 54a of the texture image 54 attached on the inner surface object 50 have a predetermined positional relation with each other. Specifically, the hole 49 of the outer surface object 48 is formed, and the outer surface object 48 and inner surface object 50 are placed, such that the hole 49 of the outer surface object 48 is located on a straight line connecting the virtual camera 42 and the highlight image portion 54a of the inner surface object 50 only in the case where the virtual camera 42 and the highlight image portion 54a of the inner surface object 50 have a predetermined positional relation with each other.

Figure 6:
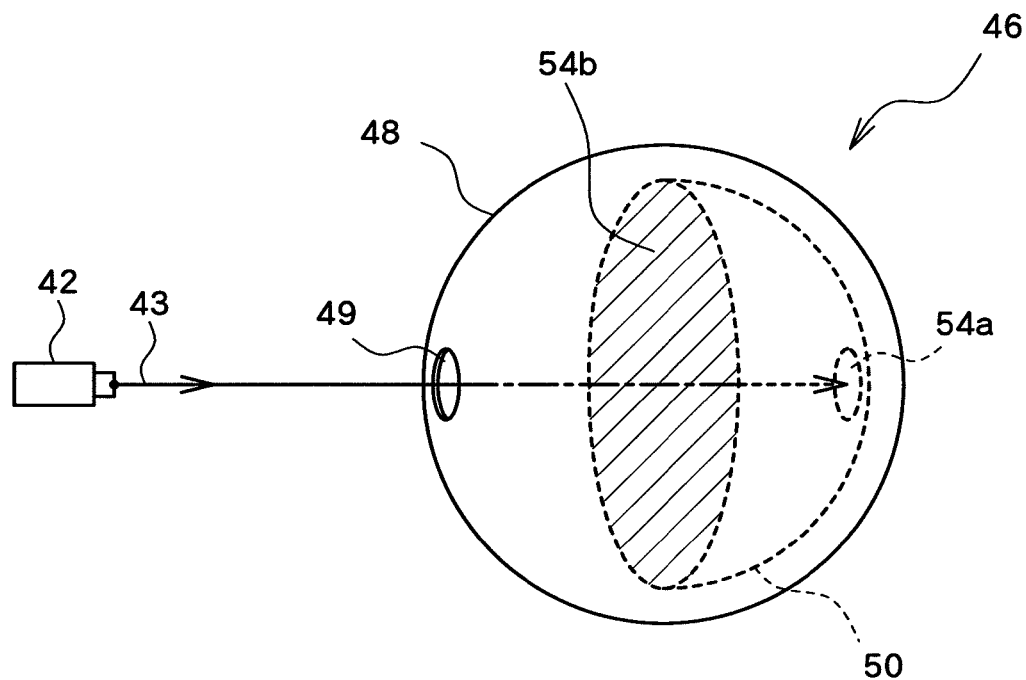
FIG. 6 is a diagram showing one example of a positional relation between a virtual camera and an eye light expressing object.

In this embodiment, "a case in which the virtual camera 42 and the highlight image portion 54a of the inner surface object 50 have a predetermined positional relation with each other" refers to "a case in which the virtual camera 42 is located in the forward direction of the highlight image portion 54a of the inner surface object 50", as shown in, e.g., FIG. 6. In more detail, "a case in which the virtual camera 42 and the highlight image portion 54a of the inner surface object 50 have a predetermined positional relation with each other" refers to "a case in which the virtual camera 42 is located in an area having an angular difference between the normal direction of the center point of the highlight image portion 54a of the inner surface object 50, and the direction from the center point of the highlight image portion 54a of the inner surface object 50 to the virtual camera 42, that is within a predetermined reference angle".

As the outer surface object 48 and inner surface object 50 are placed as described above, when, e.g., the hole 49 of the outer surface object 48 is located in the viewing direction 43 of the virtual camera 42, and the virtual camera 42, hole 49 of the outer surface object 48, and highlight image portion 54a of the inner surface object 50 are all located on one straight line (see FIG. 6), the highlight image portion 54a of the inner surface object 50 is shown in the game screen image, and highlight effect is thus caused in the game screen image. That is, a picture in which the eyes of the enemy character object sparkle is presented.

Figure 7:
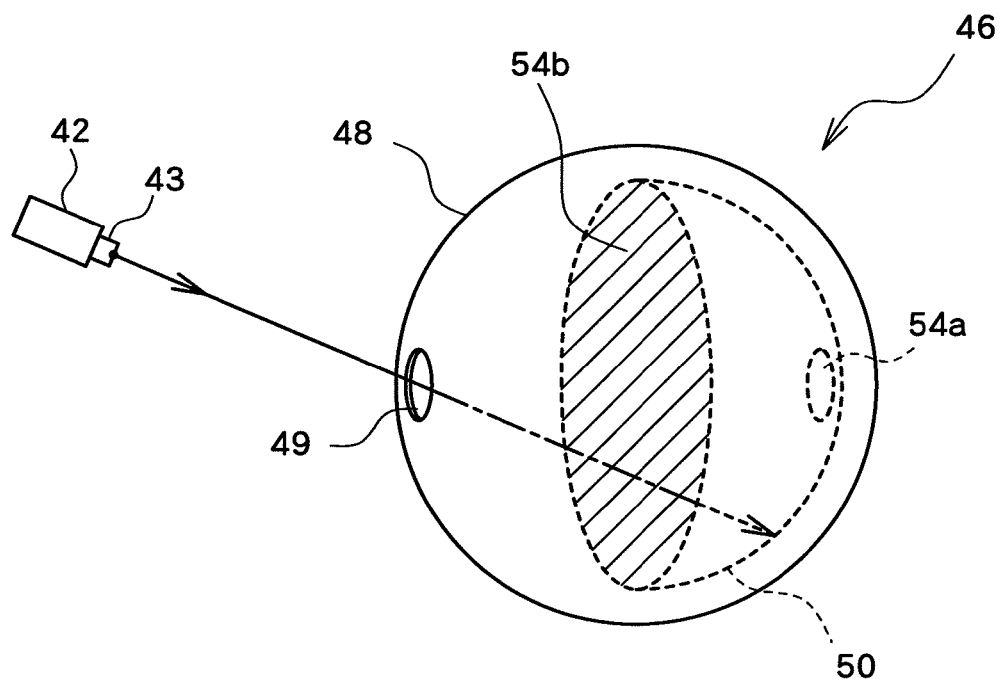
FIG. 7 is a diagram showing another example of a positional relation between the virtual camera and the eye light expressing object.

Meanwhile, when the hole 49 of the outer surface object 48 is not located in the viewing direction 43 of the virtual camera 42 or when the virtual camera 42, hole 49 of the outer surface object 48, and highlight image portion 54a of the inner surface object 50 are not located on one straight line, as shown in, e.g., FIG. 7, showing the highlight image portion 54a of the inner surface object 50 in the game screen image is restricted. In the case shown in, e.g., FIG. 7, the portion 54b other than the highlight image portion 54a of the inner surface object 50 is shown in the game screen image. In these cases, occurrence of the highlight effect in the game screen image is restricted. That is, in these cases, a picture in which the eyes of the enemy character object sparkle is not presented.

Figure 8:
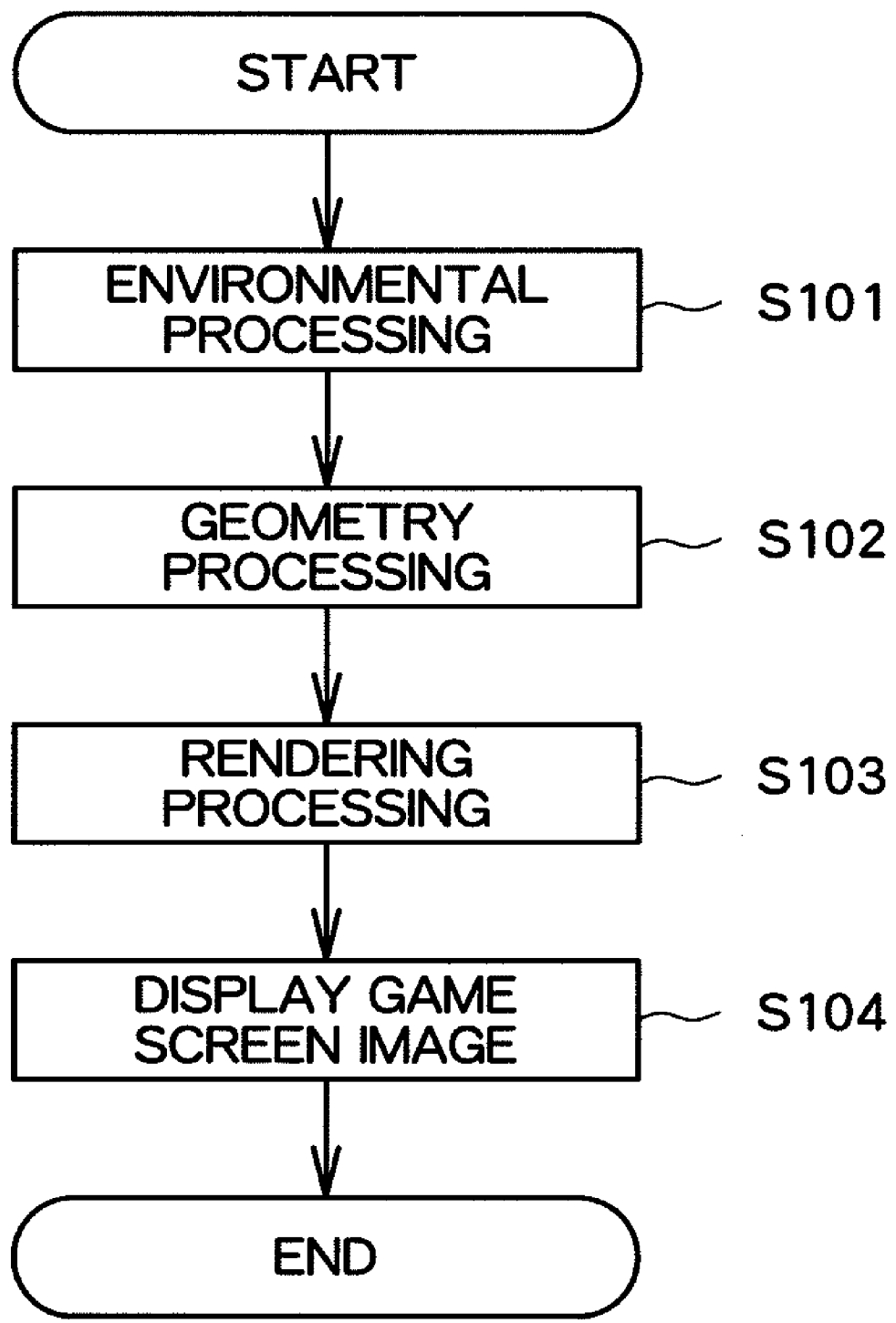
FIG. 8 is a flowchart of a process to be carried out in the game device according to the first and second embodiments.

In the following, a process to be carried out in the game device 10 according to the first embodiment will be described. FIG. 8 is a flowchart mainly showing a process according to the present invention among those to be carried out in the game device 10 according to the first embodiment every predetermined period of time (e.g., $\frac{1}{60}^{th}$ of a second).

As shown in FIG. 8, initially, environmental processing is carried out (S101) In the environmental processing, the positions and postures of all objects in the virtual three dimensional space 40 are calculated. For example, the position and posture of an enemy character object (the eye light expressing object 46) are calculated. In the environmental processing, the viewpoint coordinates, viewing direction, and viewing angle are also calculated. For example, the viewpoint coordinates and viewing direction are calculated according to a direction instruction operation carried out by the player. In the above, the content of the direction instruction operation is obtained based on an operation signal input from the controller 32. It should be noted that, e.g., the viewing angle may be, e.g., a fixed value. According to the thus calculated viewpoint coordinates, viewing direction, and viewing angle, the virtual camera 42 is virtually placed in the three dimensional space 40.

Thereafter, geometry processing is carried out (S102). In the geometry processing, coordinate conversion from the world coordinate system (XW, YW, ZW) to the viewpoint coordinate system, that is, a coordinate system having the viewpoint coordinates as the origin, the viewing direction as the Z direction, the horizontal direction as the X direction, and the vertical direction as the Y direction, is carried out. In addition, color information about vertexes of polygons forming each object is calculated based on light source information (the color and position of the light source 44). Further, clipping processing is carried out.

Thereafter, rendering processing is carried out (S103). That is, the microprocessor 14 gives the vertex coordinates, color information, and texture coordinates of vertexes of each polygon within the field of view range to the image processing unit 16. Then, the image processing unit 16 produces a game screen image in the VRAM, based on these information items. The game screen image is produced by converting each object described in the viewpoint coordinate system so as to be described in the screen coordinate system.

The game screen image produced in the VRAM is displayed on the monitor 18 at a predetermined time (S104).

As described above, in the game device 10 according to the first embodiment, when the hole 49 of the outer surface object 48 is not located in the viewing direction 43 of the virtual camera 42 or when the virtual camera 42, hole 49 of the outer surface object 48, and highlight image portion 54a of the inner surface object 50 are not located on one straight line (see FIG. 7), the highlight image portion 54a of the inner surface object 50 is not shown in the game screen image. That is, while the eyes of the player character object do not meet those of the enemy character object, a picture in which the eyes of the enemy character object sparkle is not presented.

Then, when the hole 49 of the outer surface object 48 comes to be located in the viewing direction 43 of the virtual camera 42 and the virtual camera 42, hole 49 of the outer surface object 48, and highlight image portion 54a of the inner surface object 50 come to be located on one straight line as the position and/or posture of the virtual camera 42 or the enemy character object (the eye light expressing object 46) change (see FIG. 6), the highlight image portion 54a of the inner surface object 50 is shown in the game screen image. That is, when the eyes of the player character object meet those of the enemy character object, a picture in which the eyes of the enemy character sparkle is presented.

As described above, in the game device 10 according to the first embodiment, a picture in which the eyes of the enemy character object sparkle is only presented when the eyes of the player character object meet those of the enemy character object.

As a method for presenting a picture in which the eyes of the enemy character object sparkle when the eyes of the player character object meet those of the enemy character object, the following method is possible, for example. That is, every time a process to produce a game screen image is carried out, whether or not the eyes of the player character object meet those of the enemy character object is determined based on the positions and postures of the virtual camera 42 and the enemy character object. Then, when it is determined that the eyes of the player character object meet those of the enemy character object, an object for causing highlight effect is placed on the object representative of the eyeball of the enemy character object. According to this method, however, the above described determination process is required to be carried out every time the process to produce a game screen image is carried out, and reduction of a processing load and simplification of the process are thus difficult.

Regarding this point, according to the game device 10 of the first embodiment, it is unnecessary to carry out the above described determination process every time the process to produce a game screen image is carried out, and it is therefore possible to present a picture in which the eyes of the enemy character object sparkle when the eyes of the player character object meet those of the enemy character object, while reducing a processing load. In other words, it is possible to simplify the process to realize the above-described presentation.

It should be noted that in the first embodiment, the portion 54b other than the highlight image portion 54a of the inner surface object 50 presents an image similar to the texture image 52 attached on the outer surface object 48. As a result, when the hole 49 of the outer surface object 48 is located in the viewing direction 43 of the virtual camera 42, but the virtual camera 42, hole 49 of the outer surface object 48, and highlight image portion 54a of the inner surface object 50 are not located on one straight line, as shown in, e.g., FIG. 7, an image similar to the texture image 52 attached on the outer surface object 48 is shown in the game screen image. That is, an arrangement for not giving a sense of discomfort to the player is adopted.

2. Second Embodiment

A game device (an image processing device) according to a second embodiment of the present invention has a hardware structure similar to that of the game device 10 according to the first embodiment, and thus will be described in the following with reference to FIG. 1.

In the game device 10 according to the second embodiment, a game program read from the DVD-ROM 25 is executed, whereby a game in which a player character object moves in the virtual three dimensional space is realized. In the following, a technique for presenting a picture in which a wet wall having fine concaves and convexes formed thereon glistens due to light reflection, while reducing a processing load, will be described.

Figure 9:
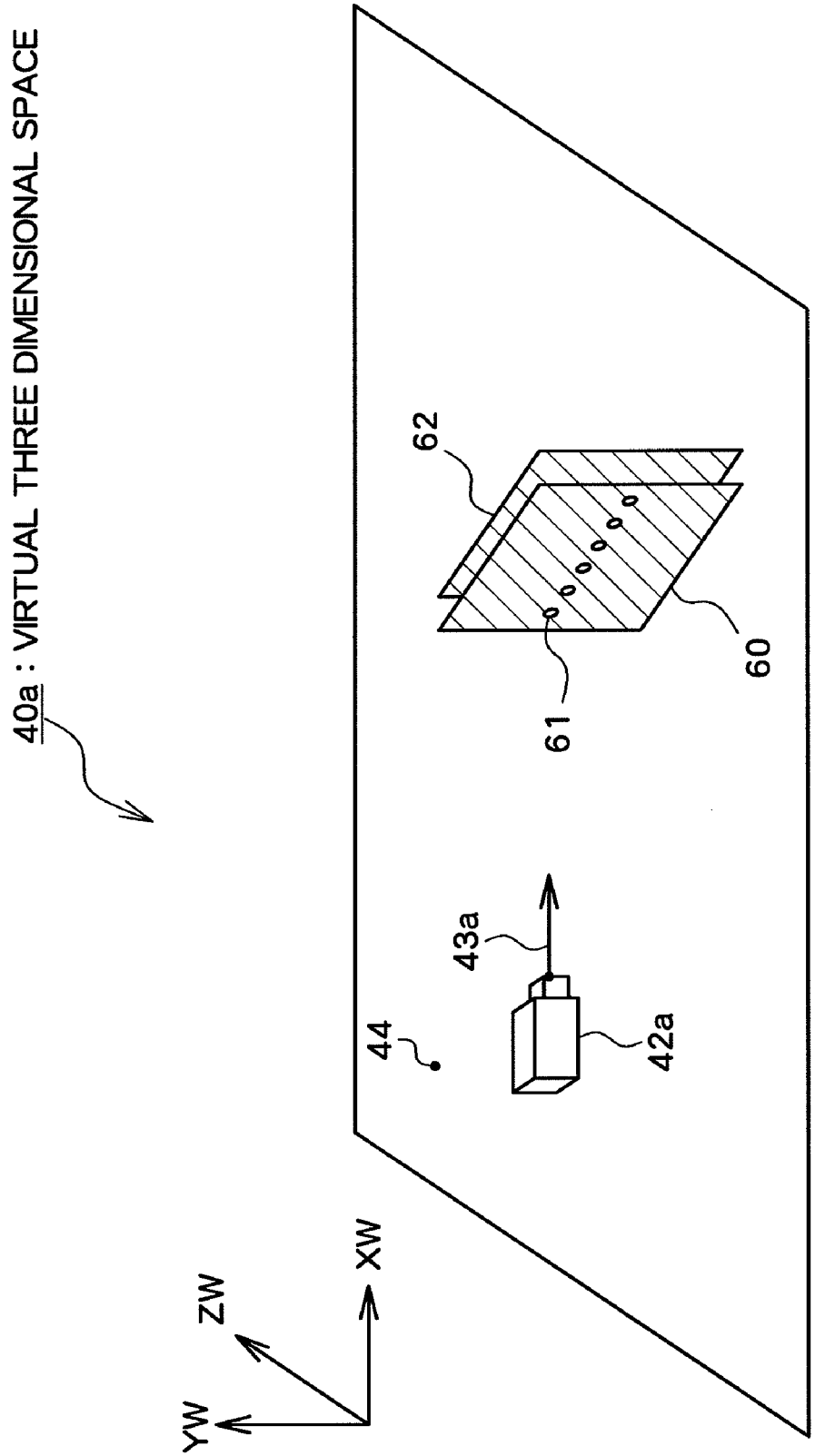
FIG. 9 is a diagram showing one example of the virtual three dimensional space.

FIG. 9 shows one example of a virtual three dimensional space created in the main memory 26. As shown in FIG. 9, a virtual camera 42a is placed in the virtual three dimensional space 40a. The virtual camera 42a is set in a similar manner to that in the virtual three dimensional space 40 in the first embodiment. Also, a light source 44 is set in the virtual three dimensional space 40a.

Further, a wall object 60 (a second object) and a highlight expressing object 62 (a first object) are placed in the virtual three dimensional space 40a. The wall object 60 is a panel object having many holes (openings) 61 formed therein piercing through to the opposite side thereof (the rear side). The space on the rear surface side of the wall object 60 can be seen through these holes 61 from the space on the front surface side of the wall object 60. A texture image representing "a wet wall having fine concaves and convexes formed therein" is attached on the wall object 60.

Figure 10:
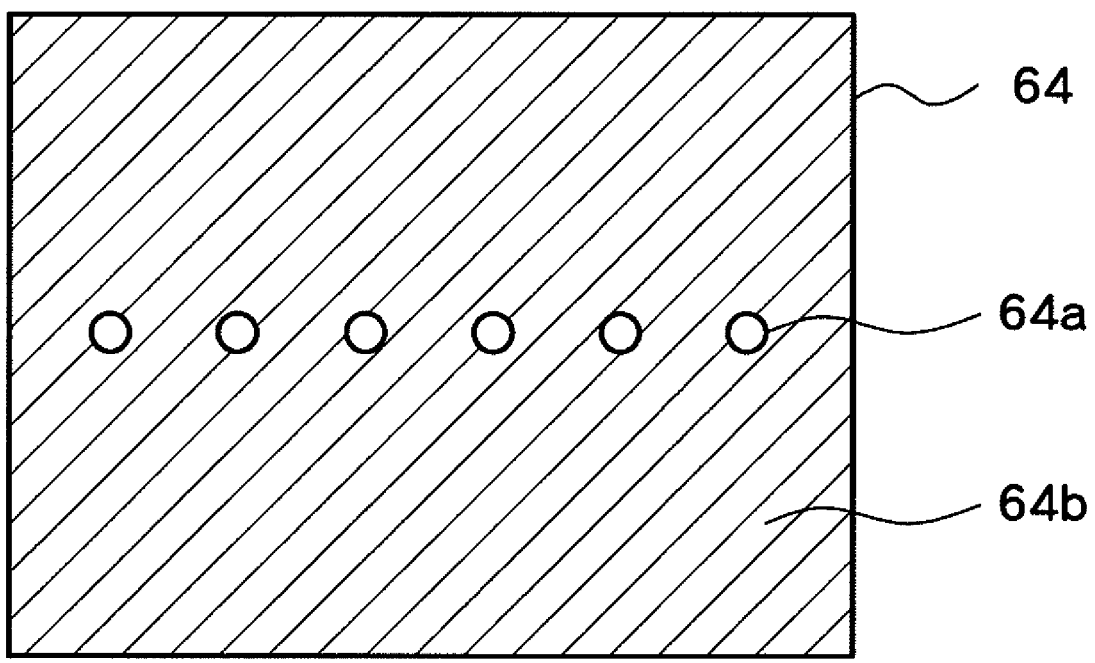
FIG. 10 is a diagram showing one example of a texture image to be attached on a highlight expressing object.

A highlight expressing object 62 is also a panel object. FIG. 10 shows a texture image to be attached on the highlight expressing object 62. As shown in FIG. 10, the texture image 64 to be attached on the highlight expressing object 62 includes a highlight image portion 64a for expressing highlight caused by light reflection and a portion 64b (the part with diagonal lines in FIG. 10) other than the highlight image portion 64a. The portion 64b other than the highlight image portion 64a presents an image having a color and/or an image pattern similar to that of the texture image attached on the wall object 60.

The wall object 60 and highlight expressing object 62 are arranged such that the hole 61 of the wall object 60 and the highlight image portion 64a of the texture image 64 attached on the highlight expressing object 62 have a predetermined positional relation with each other. Specifically, the hole 61 of the wall object 60 is formed, and the wall object 60 and highlight expressing object 62 are placed, such that the hole 61 of the wall object 60 is located on the straight line connecting the virtual camera 42a and the highlight image portion 64a of the highlight expressing object 62 only in the case where the virtual camera 42a and the highlight image portion 64a of the highlight expressing object 62 have a predetermined positional relation with each other.

In this embodiment, "a case in which the virtual camera 42a and the highlight image portion 64a of the highlight expressing object 62 have a predetermined positional relation with each other" refers to "a case in which the virtual camera 42a is located in the forward direction of the highlight image portion 64a of the highlight expressing object 62", as shown in, e.g., FIGS. 11(a) and 11(b). In more detail, "a case in which the virtual camera 42a and the highlight image portion 64a of the highlight expressing object 62 have a predetermined positional relation with each other" refers to "a case in which the virtual camera 42a is located within an area having an angular difference between the normal direction of the center point of the highlight image portion 64a of the highlight expressing object 62, and the direction from the center point of the highlight image portion 64a of the highlight expressing object 62 to the virtual camera 42a, that is within a predetermined reference angle".

As the wall object 60 and highlight expressing object 62 are arranged as described above, when, e.g., the hole 61 of the wall object 60 is located in the viewing direction 43a of the virtual camera 42a and the virtual camera 42a, hole 61 of the wall object 60, and highlight image portion 64a of the highlight expressing object 62 are all located on one straight line (see FIGS. 11(a) and 11(b)), the highlight image portion 64a of the highlight expressing object 62 is shown in the game screen image, and highlight effect is thus caused in the game screen image. That is, a picture in which the wall object 60 glistens due to light reflection is presented.

Meanwhile, when the hole 61 of the wall object 60 is not located in the viewing direction 43a of the virtual camera 42a or when the virtual camera 42a, hole 61 of the wall object 60, and highlight image portion 64a of the highlight expressing object 62 are not located on one straight line, as shown in, e.g., FIGS. 12(a) and 12(b), showing the highlight image portion 64a of the highlight expressing object 62 in the game screen image is restricted. In the case shown in, e.g., FIGS. 12(a) and 12(b), the portion 64b other than the highlight image portion 64a of the highlight expressing object 62 (an image similar to the texture image attached on the wall object 60) is shown in the game screen image. In these cases, occurrence of highlight effect in the game screen image is restricted. That is, in these cases, a picture in which the wall object 60 glistens due to light reflection is not presented.

Also in the second embodiment, a process identical to that which is carried out in the first embodiment (see FIG. 8) is carried out every predetermined period of time (e.g., $\frac{1}{60}^{th}$ of a second).

As described above, in the game device 10 according to the second embodiment, when the hole 61 of the wall object 60 is not located in the viewing direction 43a of the virtual camera 42a or when the virtual camera 42a, hole 61 of the wall object 60, and highlight image portion 64a of the highlight expressing object 62 are not located on one straight line (see FIG. 12), the highlight image portion 64a of the highlight expressing object 62 is not shown in the game screen image. That is, a picture in which the wall object 60 glistens due to light reflection is not presented.

Then, when the hole 61 of the wall object 60 comes to be located in the viewing direction 43a of the virtual camera 42a and the virtual camera 42a, hole 61 of the wall object 60, and highlight image portion 64a of the highlight expressing object 62 come to be located on one straight line (see FIG. 11) as the position and/or posture of the virtual camera 42a change, the highlight image portion 64a of the highlight expressing object 62 is shown in the game screen image. That is, a picture in which the wall object 60 glistens due to light reflection is presented.

As described above, in the game device 10 according to the second embodiment, with the position and posture of the virtual camera 42a changing, a picture in which a wet wall having concaves and convexes formed thereon glistens due to light reflection is presented.

As a method for presenting a picture in which a wet wall having fine concaves and convexes formed thereon glistens, the following method is also possible, for example. That is, every time a process to produce a game screen image is carried out, whether or not to cause highlight effect (whether or not to cause the wall to glisten) is determined based on a random number. Then, when it is determined to cause highlight effect, an object for causing a highlight effect is placed on the wall object 60. According to this method, however, the above-described determination process is required to be carried out every time the process to produce a game screen image is carried out, and reduction of a processing load and simplification of the process are thus difficult.

Regarding this point, according to the second embodiment, it is unnecessary to carry out the above described determination process every time the process to produce a game screen image is carried out, and it is therefore possible to present a picture in which a wet wall having fine concaves and convexes formed thereon glistens due to light reflection, while reducing the processing load. In other words, it is possible to simplify the process to realize the above-described presentation.

It should be noted that in the second embodiment, the portion 64b other than the highlight image portion 64a of the highlight expressing object 62 presents an image similar to the texture image attached on the wall object 60. As a result, when the hole 61 of the wall object 60 is located in the viewing direction 43a of the virtual camera 42a, but the virtual camera 42a, hole 61 of the wall object 60, and highlight image portion 64a of the highlight expressing object 62 are not located on one straight line, as shown in, e.g., FIGS. 12(a) and 12(b), an image similar to the texture image attached on the wall object 60 is shown in the game screen image. That is, an arrangement for not giving sense of discomfort to the player is adopted.

It should be noted that the present invention is not limited to the above described embodiments.

For example, in the first embodiment, a semi-transparent portion, instead of the hole 49, may be formed on the outer surface object 48 so that the inside of the outer surface object 48 can be seen from the outside of the outer surface object 48. Similarly, in the second embodiment, a semi-transparent portion, instead of the hole 61, may be formed on the wall object 60 so that the space on the rear surface side of the wall object 60 can be seen from the space on the front surface side of the wall object 60.

Figure 13:
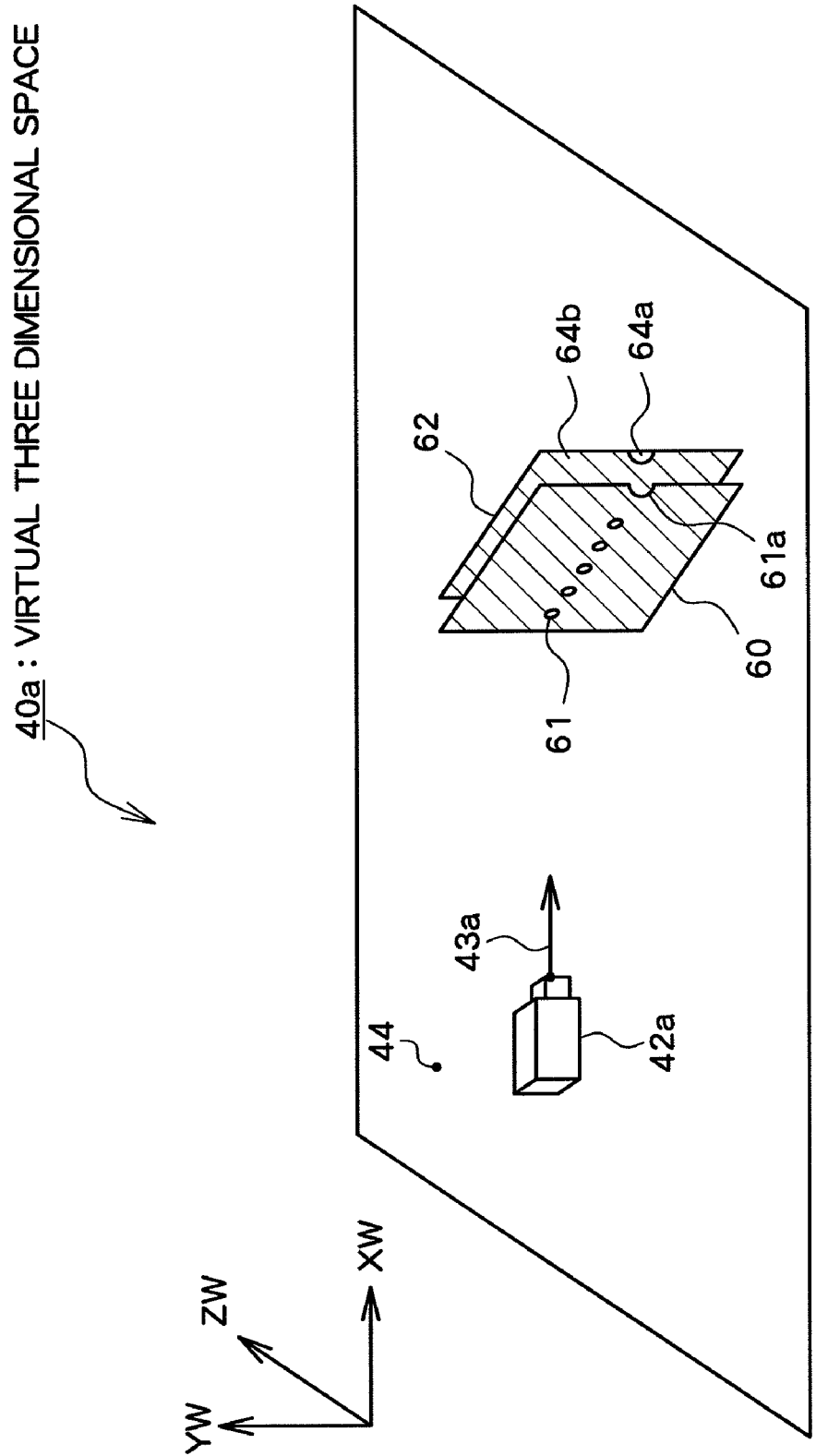
FIG. 13 is a diagram showing one example of the virtual three dimensional space.

Further, in the second embodiment, a notch 61*a*, or a partial cut-out, may be formed on the wall object 60, as shown in, e.g., FIG. 13. In this case, the wall object 60 and highlight expressing object 62 are arranged such that the notch 61*a* on the wall object 60 and the highlight image portion 64*a* of the texture image 64 attached on the highlight expressing object 62 have a predetermined positional relation with each other. Specifically, the notch 61*a* of the wall object 60 is formed, and the wall object 60 and the highlight expressing object 62 are placed, such that the notch 61*a* of the wall object 60 is located on the straight line connecting the virtual camera 42*a* and the highlight image portion 64*a* of the highlight expressing object 62 only in the case where the virtual camera 42*a* and the highlight image portion 64*a* of the highlight expressing object 62 have a predetermined positional relation with each other. That is, the highlight image portion 64*a* of the highlight expressing object 62 may also be shown in the game screen image when the notch 61*a* of the wall object 60 is located in the viewing direction 43*a* of the virtual camera 42*a* and the virtual camera 42*a*, notch 61*a* of the wall object 60, and highlight image portion 64*a* of the highlight expressing object 62 are located on one straight line, as described above. That is, a picture in which the wall object 60 glistens due to light reflection may be presented.

Also, in the first embodiment, the eye light expressing object 46 may be formed, e.g., cubic or rectangular instead of spherical. The outer surface object 48 may have any shape as long as it is hollow.

Further, the present invention can be applied to any cases other than a picture in which the eyes of an enemy character sparkle when the eyes of the player character meet those of the enemy character, or a wet wall having fine concaves and convexes formed thereon glistens due to light reflection.

Figure 14:
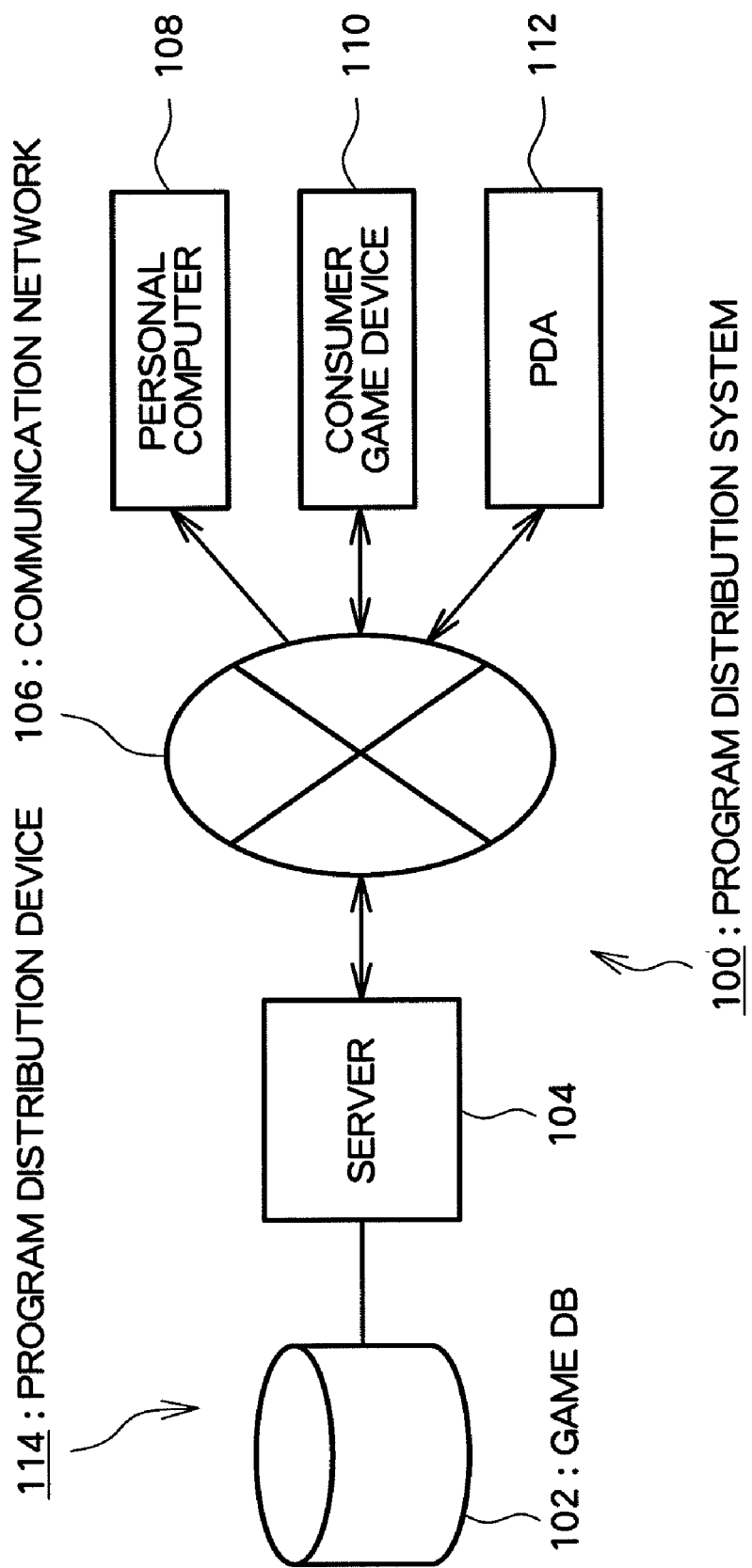
FIG. 14 is a diagram showing an entire structure of a program distribution system according to another embodiment of the present invention.

Further, although a program is supplied from the DVD-ROM 25, or an information storage medium, to the consumer game device 11 in the above description, the program may alternatively be distributed via a communication network to a home or the like. FIG. 14 is a diagram showing an overall structure of a program distribution system using a communication network. Referring to FIG. 14, a program distribution method according to the present invention will be described. As shown in FIG. 14, the program distribution system 100 comprises a game database 102, a server 104, a communication network 106, a personal computer 108, a consumer game device 110, and a PDA (personal digital assistant) 112, in which the game database 102 and the server 104 together constitute a program distribution device 114. The communication network 106 comprises, e.g., the Internet, a cable television network, and the like. In this system, a program having content identical to that stored in the DVD-ROM 25 is stored in the game database (an information storage medium) 102. When a person requests game distribution, using the personal computer 108, consumer game device 110, PDA 112, or the like, the request is transmitted via the communication network 106 to the server 104. Then, the server 104, in response to the game distribution request, reads the program from the game database 102, and sends to the entity, such as the personal computer 108, consumer game device 110, PDA 112, or the like, having requested the game distribution. It should be noted that although a game is distributed here in response to a game distribution request, the server 104 may unidirectionally send a game. Also, it is unnecessary to distribute at once all program components necessary to realize a game (collective distribution), and distribution of only a component necessary in each aspect of the game (divided distribution) is applicable instead. With the above described game distribution via the communication network 106, a person wishing to obtain a program can readily obtain the program.

The invention claimed is:

1. An image processing device for displaying a picture obtained by viewing a virtual three dimensional space from a given viewpoint, comprising:
   means for placing a first object in the virtual three dimensional space, the first object having a texture image including a highlight image portion, an area of the highlight image portion being smaller than an area of the texture image, for presenting highlights caused by light reflection; and
   means for placing a second object, having an opening, a notch, or a semi-transparent portion formed on a part thereof, in the virtual three dimensional space such that a position, in the virtual three dimensional space, of the highlight image portion of the texture image attached on the first object and a position, in the virtual three dimensional space, of the opening, the notch, or the semi-transparent portion of the second object, have a predetermined positional relation with each other, the predetermined positional relation comprising the opening, the notch or the semi-transparent portion being interposed between and spaced apart from the view point and the first object,
   wherein the second object is a volumetric, three-dimensional hollow object, and the first object is placed inside the second object.

2. The image processing device according to claim 1, wherein the second object is placed such that the opening, the notch, or the semi-transparent portion of the second object is located on a straight light connecting a position of the viewpoint and the position, in the virtual three dimensional space, of the highlight image portion of the texture image attached on the first object only in the case where the position of the viewpoint and the position, in the virtual three dimensional space, of the highlight image portion of the texture image attached on the first object, have a predetermined positional relation with each other.

3. The image processing device according to claim 2, wherein a texture image is attached on the second object, and an image for a portion other than the highlight image portion of the texture image attached on the first object is an image based on the texture image attached on the second object.

4. The image processing device according to claim 1, wherein a texture image is attached on the second object, and an image for a portion other than the highlight image portion of the texture image attached on the first object is an image based on the texture image attached on the second object.

5. The image processing device of claim 1, wherein the opening comprises a plurality of holes arranged so as to generate an impression of a corresponding plurality of the highlights.

6. The image processing device according to claim 1, wherein the second object comprises an eyeball object representing an eyeball of an enemy character, and the first object comprises an expression of a sparkle of the eyeball of the enemy character, caused by a light reflection.

7. An image processing method for displaying a picture obtained by viewing a virtual three dimensional space from a given viewpoint, comprising:
   a step of placing a first object in the virtual three dimensional space, the first object having a texture image including a highlight image portion, an area of the highlight image portion being smaller than an area of the texture image, for presenting highlights caused by light reflection; and
   a step of placing a second object, having an opening, a notch, or a semi-transparent portion formed on a part thereof, in the virtual three dimensional space such that a position, in the virtual three dimensional space, of the highlight image portion of the texture image attached on the first object and a position, in the virtual three dimensional space, of the opening, the notch, or the semi-transparent portion of the second object, have a predetermined positional relation with each other, the predetermined positional relation comprising the opening, the notch or the semi-transparent portion being interposed between and spaced apart from the view point and the first object,
   wherein the second object is a volumetric, three-dimensional hollow object, and the first object is placed inside the second object.

8. The method of claim 7, wherein the second object is placed such that the opening, the notch, or the semi-transparent portion of the second object is located on a straight light connecting a position of the viewpoint and the position, in the virtual three dimensional space, of the highlight image portion of the texture image attached on the first object only in the case where the position of the viewpoint and the position, in the virtual three dimensional space, of the highlight image portion of the texture image attached on the first object, have a predetermined positional relation with each other.

9. The method of claim 7, wherein a texture image is attached on the second object, and an image for a portion other than the highlight image portion of the texture image attached on the first object is an image based on the texture image attached on the second object.

10. The method of claim 7, wherein the opening comprises a plurality of holes arranged so as to generate an impression of a corresponding plurality of the highlights.

11. The method of claim 7, wherein a texture image is attached on the second object, and an image for a portion other than the highlight image portion of the texture image attached on the first object is an image based on the texture image attached on the second object.

12. The method of claim 7, wherein the second object comprises an eyeball object representing an eyeball of an enemy character, and the first object comprises an expression of a sparkle of the eyeball of the enemy character, caused by a light reflection.

13. A non-transitory computer readable information storage medium storing a program for causing a computer to function as an image processing device for displaying a picture obtained by viewing a virtual three dimensional space from a given viewpoint, the computer functioning as:
   means for placing a first object in the virtual three dimensional space, the first object having a texture image including a highlight image portion, an area of the highlight image portion being smaller than an area of the texture image, for presenting highlights caused by light reflection; and
   means for placing a second object, having an opening, a notch, or a semi-transparent portion formed on a part thereof, in the virtual three dimensional space such that a position, in the virtual three dimensional space, of the highlight image portion of the texture image attached on the first object and a position, in the virtual three dimensional space, of the opening, the notch, or the semi-transparent portion of the second object, have a predetermined positional relation with each other, the predetermined positional relation comprising the opening, the notch or the semi-transparent portion being interposed between and spaced apart from the view point and the first object,
   wherein the second object is a volumetric, three-dimensional hollow object, and the first object is placed inside the second object.

14. The non-transitory computer readable information storage medium of claim 13, wherein the second object is placed such that the opening, the notch, or the semi-transparent portion of the second object is located on a straight light connecting a position of the viewpoint and the position, in the virtual three dimensional space, of the highlight image portion of the texture image attached on the first object only in the case where the position of the viewpoint and the position, in the virtual three dimensional space, of the highlight image portion of the texture image attached on the first object, have a predetermined positional relation with each other.

15. The non-transitory computer readable information storage medium of claim 13, wherein the opening comprises a plurality of holes arranged so as to generate an impression of a corresponding plurality of the highlights.

16. The non-transitory computer readable information storage medium of claim 13, wherein the second object comprises an eyeball object representing an eyeball of an enemy character, and the first object comprises an expression of a sparkle of the eyeball of the enemy character, caused by a light reflection.

* * * * *